US012760594B2

(12) United States Patent
Pan et al.

(10) Patent No.: US 12,760,594 B2
(45) Date of Patent: Oct. 13, 2026

(54) PULL CORD PROTECTION ASSEMBLY FOR CURTAIN AND CURTAIN INCLUDING SAME

(71) Applicant: HANGZHOU GIPUTA CLOTHING CO., LTD., Hangzhou (CN)

(72) Inventors: Yu Pan, Hangzhou (CN); Michael Alexander Mayer, Hangzhou (CN)

(73) Assignee: HANGZHOU GIPUTA CLOTHING CO., LTD., Hangzhou (CN)

( * ) Notice: Subject to any disclaimer, the term of this patent is extended or adjusted under 35 U.S.C. 154(b) by 256 days.

(21) Appl. No.: 18/663,064

(22) Filed: May 14, 2024

(65) Prior Publication Data

US 2025/0109632 A1 Apr. 3, 2025

(30) Foreign Application Priority Data

Sep. 28, 2023 (CN) ........................ 202311270025.9

(51) Int. Cl.
*E06B 9/326* (2006.01)
*E06B 9/262* (2006.01)

(52) U.S. Cl.
CPC .............. *E06B 9/326* (2013.01); *E06B 9/262* (2013.01); *E06B 2009/2622* (2013.01); *E06B 2009/2625* (2013.01)

(58) Field of Classification Search
CPC .......... E06B 9/262; E06B 9/382; E06B 9/384; E06B 2009/2622; E06B 2009/2625
See application file for complete search history.

(56) References Cited

U.S. PATENT DOCUMENTS 4,921,032 A * 5/1990 May ........................ E06B 9/262 160/84.01
5,613,540 A * 3/1997 Jelic ........................ E06B 9/326 160/178.3
6,792,995 B2 * 9/2004 Judkins ................... E06B 9/326 160/173 R
8,365,795 B2 * 2/2013 Perkowitz ............... E06B 9/262 160/84.01
8,813,807 B1 * 8/2014 LeBlanc ................... E06B 9/24 160/84.01

(Continued)

FOREIGN PATENT DOCUMENTS

CN 202078108 U * 12/2011
WO WO-2015148439 A1 * 10/2015 ............... E06B 9/58

*Primary Examiner* — Johnnie A. Shablack
(74) *Attorney, Agent, or Firm* — Greer, Burns & Crain, Ltd

(57) ABSTRACT

Provided is a pull cord protection assembly for a curtain. The curtain includes a cover portion provided with a plurality of positioning rings and a pull cord configured to control lifting and lowering of the curtain, the pull cord protection assembly includes a plurality of segments that are connected end to end sequentially, each of the plurality of segments including: a flexible sheath in a tubular shape and having a hollow internal channel, the flexible sheath having a first end and a second end; a connection head capable of being fixedly connected to the first end of the flexible sheath; and a connection socket capable of being fixedly connected to the second end of the flexible sheath, in which a connection head and a connection socket of two adjacent segments are capable of being connected to each other and holding one of the plurality of positioning rings therebetween.

20 Claims, 10 Drawing Sheets

(56) References Cited

U.S. PATENT DOCUMENTS

| | | | | |
|---|---|---|---|---|
| 9,010,399 | B2 * | 4/2015 | Perkowitz ............... | E06B 9/262<br>160/84.01 |
| 9,366,078 | B2 * | 6/2016 | Choi ....................... | E06B 9/326 |
| 2011/0024065 | A1 * | 2/2011 | Lin ......................... | E06B 9/262<br>160/340 |
| 2011/0209834 | A1 * | 9/2011 | Lowry .................... | E06B 9/326<br>24/122.3 |
| 2011/0297335 | A1 * | 12/2011 | Su ........................... | E06B 9/262<br>160/340 |
| 2012/0125544 | A1 * | 5/2012 | Cannaverde ............ | E06B 9/262<br>160/84.02 |
| 2012/0168094 | A1 * | 7/2012 | Lin ......................... | E06B 9/262<br>160/340 |
| 2012/0186753 | A1 * | 7/2012 | Tsai ........................ | E06B 9/262<br>160/84.04 |
| 2016/0348427 | A1 * | 12/2016 | Zhang ..................... | E06B 9/326 |
| 2025/0109632 | A1 * | 4/2025 | Pan ......................... | E06B 9/326 |

* cited by examiner

PULL CORD PROTECTION ASSEMBLY FOR CURTAIN AND CURTAIN INCLUDING SAME

CROSS-REFERENCE TO RELATED APPLICATION(S)

This application claims priority to Chinese Application No. 202311270025.9 filed on Sep. 28, 2023, the disclosure of which is incorporated herein by reference in its entity.

FIELD

The present disclosure relates to a pull cord protection assembly for a curtain and a curtain including the pull cord protection assembly.

BACKGROUND

A curtain, such as Roman-shades, typically has a cover portion, such as a curtain shading material, that is mated with a window. The cover portion typically extends downwardly from an upper beam of the curtain and may be folded or unfolded by means of a manipulation mechanism to cover the window or to expose the window. The manipulation mechanism, especially the manipulation mechanism of the Roman-shades, usually uses a pull cord to control and adjust lifting and lowering of the curtain shading material. The pull cord is generally connected between the upper beam and a lower rail, which is easily accessible by a user, and children may easily have a risk of entanglement, such as wrapping their necks, due to misoperation.

For this reason, in the related art, for example in US20130020037A1, a flexible sheath made of fabric or the like is disclosed. The flexible sheath accommodates a pull cord therein and is disposed at a back side of a curtain, and in order to ensure smooth folding and unfolding, the flexible sheath needs to be fixedly connected to buttonholes arranged on a curtain shading material by means of knitting or the like, which is expensive to manufacture and assemble, and has limited reliability in realizing folding and unfolding.

SUMMARY

The present disclosure provides a pull cord protection assembly and a curtain including the pull cord protection assembly.

According to a first aspect of the present disclosure, a pull cord protection assembly for a curtain is provided. The curtain includes a cover portion, the cover portion being provided with a plurality of positioning rings arranged in a vertical direction of the cover portion, and the curtain further includes a pull cord configured to control lifting and lowering of the curtain, in which the pull cord protection assembly includes a plurality of segments that are connected end to end sequentially, each of the plurality of segments including: a flexible sheath in a tubular shape and having a hollow internal channel through which the pull cord may pass, the flexible sheath having a first end and a second end; a connection head capable of being fixedly connected to the first end of the flexible sheath and having a hollow internal channel; and a connection socket capable of being fixedly connected to the second end of the flexible sheath and having a hollow internal channel, in which a connection head and a connection socket of two adjacent segments are capable of being connected to each other and holding one of the plurality of positioning rings therebetween.

The operating principle of the pull cord protection assembly according to the present disclosure is different from that of the conventional pull cord protection assembly. The pull cord protection assembly is designed to have the plurality of segments that are connected end to end, and the segments are connected by using the connection head and the connection socket between the segments. During mounting, it is sufficient to connect a connection head of a segment to a connection socket of a segment, and to accommodate a corresponding positioning ring between the connection head and the connection socket without fixing the sheath itself to the positioning ring by means of knitting or the like. In this way, it not only reduces the complexity of production and assembly, but also provides a more reliable connection structure as well as easier maintenance.

According to some embodiments of the present disclosure, the connection head and the connection socket of two adjacent segments are connected to each other in a form-fit locking manner or a force locking manner.

According to some embodiments of the present disclosure, the connection head and the connection socket are connected to each other in an snap-fit manner.

According to some embodiments of the present disclosure, the connection head and the connection socket are connected to each other in a thread-connection manner.

According to some embodiments of the present disclosure, the connection head is fixedly connected to the first end of the flexible sheath in an injection molding or a gluing manner, and the connection socket is fixedly connected to the second end of the flexible sheath in an injection molding or a gluing manner.

According to some embodiments of the present disclosure, the pull cord protection assembly includes two sheath fixation members configured to fixedly connect the first end and the second end of the flexible sheath to the connection head and the connection socket, respectively. By using the sheath fixation members, the process of injection molding or gluing the flexible sheath with the connection head and the connection socket can be omitted, and the assembly can be further simplified.

According to some embodiments of the present disclosure, each of the connection head and the connection socket has one end configured to have an external thread, and each of the two sheath fixation members is configured as an annular sleeve having an internal thread, in such a manner that the two sheath fixation members are capable of fixing the flexible sheath between the connection head and the connection socket when thread-connected to the connection head and the connection socket, respectively. Preferably, each of the two sheath fixation members is configured to have a protrusion structure on an outer surface thereof for anti-slip.

According to some embodiments of the present disclosure, the connection head has one end configured as a first connection structure having a hollow columnar shape, the first connection structure being hinged to two first connection half parts at two positions of the first connection structure, respectively, and the two positions being symmetrical with respect to a central axis of the first connection structure, in which the two first connection half parts are pivotable to a first fixation position, and at the first fixation position, the two first connection half parts are engaged with each other and are each engaged with the first connection structure to fix the first end of the flexible sheath between the two first connection half parts and the first connection structure. The connection socket has one end configured as a second connection structure having a hollow columnar shape, the second connection structure being hinged to two second connection half parts at two positions of the second connection structure, respectively, and the two positions being symmetrical with respect to a central axis of the second connection structure, in which the two second connection half parts are pivotable to a second fixation position, and at the second fixation position, the two second connection half parts are engaged with each other and are each engaged with the second connection structure to fix the second end of the flexible sheath between the two second connection half parts and the second connection structure. By using this construction method, the structure configured to fix the flexible sheath can be integrated into the connection head and the connection socket, so that the number of mounting accessories can be reduced. Each of the first connection structure and the second connection structure may be, for example, in a hollow cylindrical shape, but may of course also be in other shapes, such as a hollow square column shape. Similarly, each of the first connection half part and the second connection half part may be, for example, in a semi-cylindrical shape, but may of course also be in other shapes, such as a semi-square-column shape.

According to some embodiments of the present disclosure, one of the connection head and the connection socket has a protrusion structure, and the other one of the connection head and the connection socket has a recess structure that matches with the protrusion structure in shape, and in which the connection head and the connection socket are each made of an elastic material and capable of being connected to each other in an interference fit manner. This construction method makes mounting and disassembly easier.

According to some embodiments of the present disclosure, the flexible sheath is made of a fabric material.

According to a second aspect of the present disclosure, a curtain is provided. The curtain includes: an upper beam; a mounting assembly configured to fix the upper beam to a surface to be mounted; a cover portion having a flat shape and extending downwardly from the upper beam, the cover portion being provided with a plurality of positioning rings arranged in a vertical direction; a pull cord configured to control lifting and lowering of the curtain; in which the pull cord protection assembly includes a plurality of segments that are connected end to end sequentially, each of the plurality of segments including: a flexible sheath in a tubular shape and having a hollow internal channel through which the pull cord passes, the flexible sheath having a first end and a second end; a connection head capable of being fixedly connected to the first end of the flexible sheath and having a hollow internal channel; and a connection socket capable of being fixedly connected to the second end of the flexible sheath and having a hollow internal channel, in which a connection head and a connection socket of two adjacent segments are capable of being connected to each other and holding one of the plurality of positioning rings therebetween.

According to some embodiments of the present disclosure, the connection head and the connection socket of two adjacent segments are connected to each other in a form-fit locking manner or a force locking manner.

According to some embodiments of the present disclosure, the curtain further includes a pull cord drive device and a pull cord retainer that are disposed below the upper beam.

According to some embodiments of the present disclosure, the curtain further includes a lower rail disposed below the cover portion, the lower rail being fixedly connected to a mounting bracket that is connected to a lower end of the pull cord, the mounting bracket being capable of being connected to a connection socket of a lowermost segment of the pull cord protection assembly in a form-fit locking manner or a force locking manner.

According to some embodiments of the present disclosure, the mounting assembly includes a first member configured to have an L-shaped body, the L-shaped body including a first side surface extending vertically and a first top surface extending horizontally, and a second member configured to be L-shaped and having a second side surface extending vertically and a second top surface extending horizontally, in which the first side surface is fixedly connected to a screw rod, the screw rod penetrating through a through hole formed at the second side surface and extending horizontally, and the screw rod being capable of matching with an adjustment nut to drive the first member to move in a horizontal direction. The mounting assembly of this structure eliminates the need for drilling holes on the surface to be mounted, and facilitates mounting and disassembly.

According to some embodiments of the present disclosure, the first top surface is provided with a guide member, the guide member being slidable in a guide groove formed at an end of the upper beam to be guided to move in a horizontal direction.

According to some embodiments of the present disclosure, the second top surface has at least one mounting hole configured to be fixedly connected to the upper beam.

According to some embodiments of the present disclosure, the mounting assembly further includes an anti-slip element having a flat shape, the anti-slip element being in contact with a surface to be mounted during mounting, and the first member has a recess formed at the first side surface thereof and configured to accommodate the anti-slip element.

It should be understood that the above summary is provided merely for purposes of summarizing some exemplary implementations so as to provide a basic understanding of some aspects of the present disclosure. Accordingly, it should be understood that the embodiments summarized above are merely examples, and should not be construed as limiting the scope or spirit of the present disclosure in any way. Other exemplary embodiments, aspects and advantages will become apparent from the following detailed description of embodiments taken in conjunction with the accompanying drawings illustrating the principles of some of the exemplary embodiments.

BRIEF DESCRIPTION OF THE DRAWINGS

Exemplary embodiments of the present disclosure are explained in more detail below with reference to the accompanying drawings. Note that the accompanying drawings are not necessarily drawn to scale, in which.

DETAILED DESCRIPTION

Exemplary embodiments of the present disclosure are described below with reference to the accompanying drawings, in which various details of the embodiments of the present disclosure are included to assist understanding, and which are to be considered as merely exemplary. Accordingly, those skilled in the art will recognize that various changes and modifications of the embodiments described herein can be made without departing from the scope and spirit of the present disclosure. Also, descriptions of well-known functions and constructions are omitted in the following description for clarity and conciseness.

Figure 1:
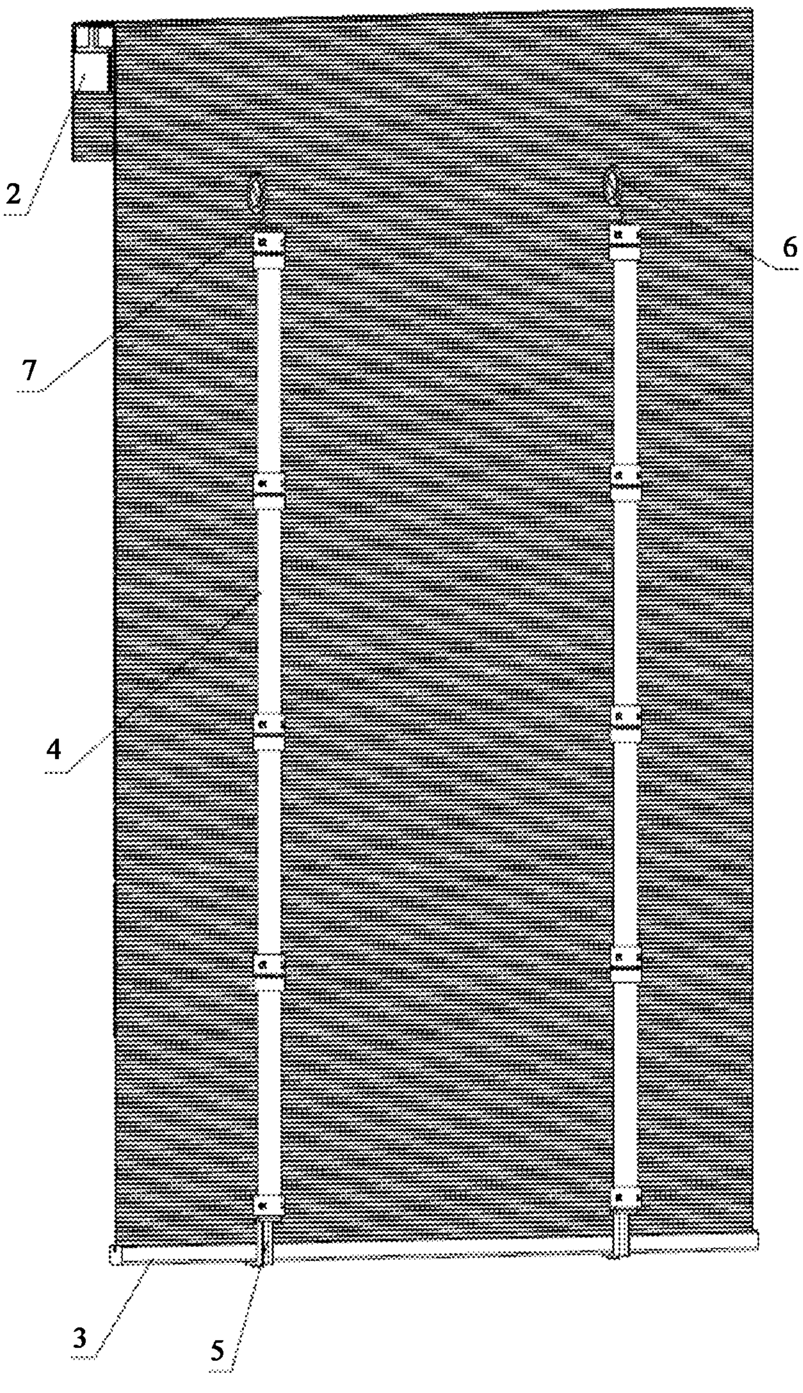
FIG. 1 shows a schematic diagram of a curtain according to an embodiment of the present disclosure.

FIG. 1 shows a schematic diagram of a curtain 100 according to an embodiment of the present disclosure, in which some structures of the curtain are omitted for clarity of illustration.

As shown in FIG. 1, in the embodiment, a curtain 100 configured as a Roman-shades, includes a cover portion 1, such as a curtain shading material, which in this embodiment is made of thin bamboo filaments. Several longitudinally arranged woven cords (not shown) fix the bamboo filaments to form the cover portion 1 in a flat shape. Of course, as is well known in the art, the cover portion 1 may be made of any other suitable material and in any other suitable form. For example, the cover portion 1, i.e. the curtain shading material may be made of an opaque or partially opaque fabric, and the bamboo filaments may also be replaced with wood, plastic materials, or metal materials. In addition, the curtain 100 may also be configured in other common forms than the Roman-shades, which will not be enumerated herein. FIG. 1 further shows a mounting assembly 2 configured to fix a curtain to a wall surface or other structures near a window of a building or the like, and fixedly connected to an upper beam which is not shown in FIG. 1 and will be explained later on.

As further shown in FIG. 1, in this embodiment, two parallel segments of two pull cords 7 configured to manipulate unfolding and folding of a curtain shading material respectively pass through two buttonholes 6 arranged at the curtain shading material side by side. Each of the two buttonholes 6 is arranged a distance below an upper end of the curtain 100 and is configured to guide the pull cords 7. The pull cord 7 extends vertically downwards from the buttonhole 6 to a mounting bracket 5 at a lower end of the curtain 100 and is fixed to the mounting bracket 5. In this embodiment, the curtain 100 is further provided with a lower rail 3 at the lower end thereof, the lower rail 3 being used for counterweight and protection of the curtain shading material. The lower rail 3 is fixedly connected to the mounting bracket 5 and accommodates a lower end of the curtain shading material 1 in a slot inside the lower rail. Note that in another embodiment, the buttonholes may not be provided, for example, when the pull cord 7 and a corresponding pull cord drive device are arranged on a same side of the curtain shading material.

FIG. 1 further shows a pull cord protection assembly 4 according to the present disclosure. The pull cord protection assembly 4 accommodates a portion of the pull cord 7 extending downwardly from the buttonhole 6 to the vicinity of the mounting bracket 5 in an internal channel inside the pull cord protection assembly. In this way, a user, especially a child, can be prevented from getting tangled by direct contact with the pull cord.

Figure 2:
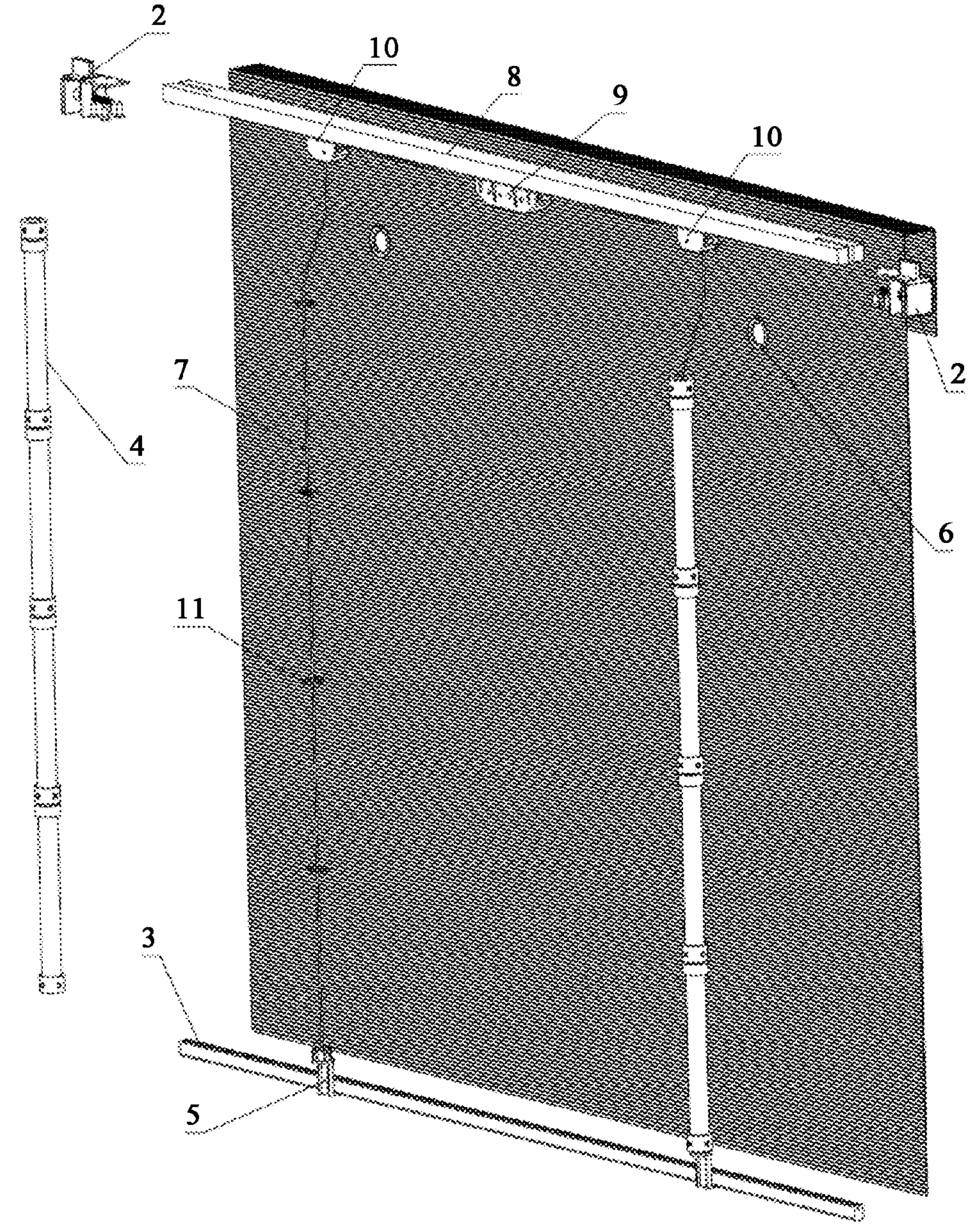
FIG. 2 schematically shows exploded views of several major components of the curtain 100 in FIG. 1.

FIG. 2 schematically shows exploded views of several major components of the curtain 100 in FIG. 1. An upper beam 8 not shown in FIG. 1 is shown in FIG. 2. The upper beam 8 may be fixed to a wall surface or the like by mounting assemblies 2 at both ends, thereby mounting the entire curtain in the vicinity of the window. In addition, the cover portion 1, that is, the curtain shading material, is also mounted at the upper beam 8. The upper beam 8 is provided with a pull cord drive device 9 and two pull cord retainers 10 at a lower end surface of the upper beam 8, the pull cord drive device 9 being configured to implement an extension and retraction operation of the pull cord. In a natural hanging state of the curtain shading material, the pull cord retainer has certain resistance to the pull cord in a retraction direction, which can prevent to a certain extent the retraction of the pull cord under the action of the pull cord drive device. The specific structure and implementation of each of the pull cord drive device 9 and the pull cord retainer are well known to those skilled in the art, which will not be elaborated herein.

As further shown in the schematic exploded view of FIG. 2, the two pull cords 7 extend upwardly from the two mounting brackets 5 located below, respectively. Each of the two pull cords 7 then passes through a plurality of positioning rings (also referred to as fixation rings) 11 arranged at the curtain shading material in the vertical direction to the pull cord retainer 10 below the upper beam 8, and is connected to the pull cord drive device 9 via the pull cord retainer 10. Of course, the number of pull cords 7 is not limited to two, but may be more, and in the presence of more pull cords 7, it may be necessary to provide more corresponding pull cord drive devices. It should be noted that, for the sake of clarity, the upper beam 8 at the back side is shown at the front side, whereas an actual extension direction of the pull cord 7 is that the pull cord 7 passes through the corresponding buttonhole 6 above the uppermost positioning ring to the back side of the curtain shading material, further passes through the pull cord retainer 10 and the pull cord drive device 9, etc., and then extends back to the front side of the curtain shading material from the other buttonhole 6 and extends downwardly. The plurality of positioning rings configured, on the one hand, to guide the pull cord 7 and, on the other hand, as positioning means when the curtain shading material is folded. In other words, when the curtain shading material is folded through the pull cord, the curtain shading material is folded in the vertical direction at positions between the plurality of positioning rings 11.

Figure 3:
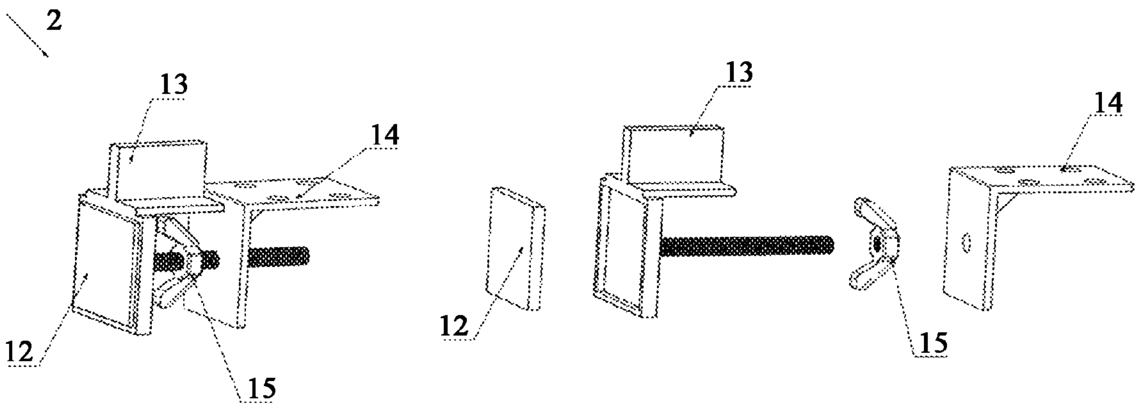
FIG. 3 shows a schematic diagram of a mounting assembly 2 according to an embodiment of the present disclosure.
Figure 4:
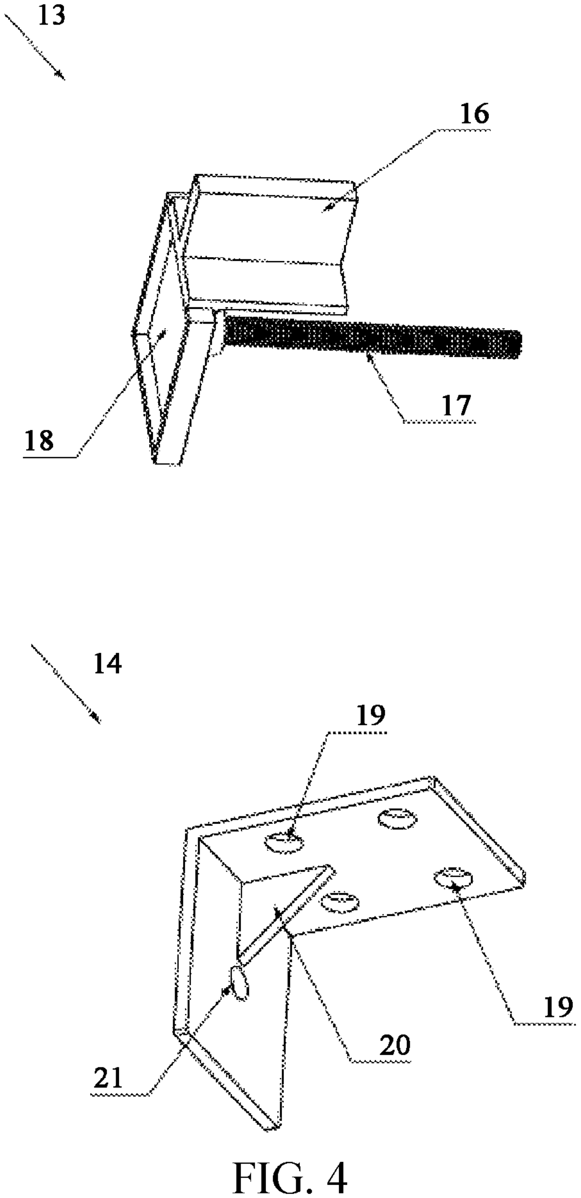
FIG. 4 shows details of a first member and a second member of the mounting assembly 2 in FIG. 3.

FIG. 3 and FIG. 4 show schematic diagrams of a mounting assembly 2 according to an embodiment of the present disclosure. As shown in FIG. 3 and FIG. 4, the mounting assembly 2 includes a first member 13 (also referred to as a top block) and a second member (also referred to as a mounting support bracket) 14. The first member 13 is configured to have an L-shaped body, i.e. have a first side surface extending vertically and a first top surface extending horizontally. The first top surface is provided with a guide member (also referred to as a baffle plate) 16. As shown in FIG. 2, the guide member 16 is slidable in one of guide grooves formed at both ends of the upper beam 8 during mounting, in such a manner that the first member 13 may be guided in the guide groove of the upper beam 8 in a horizontal direction. The first member 13 is provided with a screw rod 17 at a side of the first side surface of the first member 13 away from a support surface to be fixed. The screw rod 17 is configured to cooperate with the adjustment nut 15 to apply a thrust force to push the first member 13 to move in the horizontal direction. The second member 14 is configured to be L-shaped and also has a second side surface extending vertically and a second top surface extending horizontally. The mounting assembly 2 further includes an anti-slip element 12, such as a silicone pad. The anti-slip element 12, during mounting, is in contact with a support surface to be mounted, such as a wall surface near a window, to increase friction and thereby prevent relative sliding. For this purpose, the first member 13 may have a recess formed at the first side surface thereof. The recess is matched with the anti-slip element 12 in shape and is configured to accommodate the anti-slip element 12. The second member 14 has a through hole 21 at the second side surface thereof. The through hole 21 is used for the screw rod 17 to pass through. Preferably, the second member 14 is provided with a reinforce rib 20 between the second side surface and the second top surface of the second member 14 for a purpose of reinforcing. The second member 14 has at least one, preferably a plurality of mounting holes 19 at the second top surface thereof. The mounting holes 19 is used herein for fixedly connecting the second member 14 to the upper beam 8, for example by means of bolts or the like, in such a manner that the whole curtain 100 can be fixed to a mounting surface merely by fixing the mounting assembly 2 to the mounting surface such as a wall surface. The mounting assembly 2 as described above has the advantage that only the adjustment nut 15 needs to be rotated during mounting and disassembly, the operation is simple and the expansion screw or the like does not need to be punched to mount, thereby eliminating the need to damage the wall surface.

Figure 5:
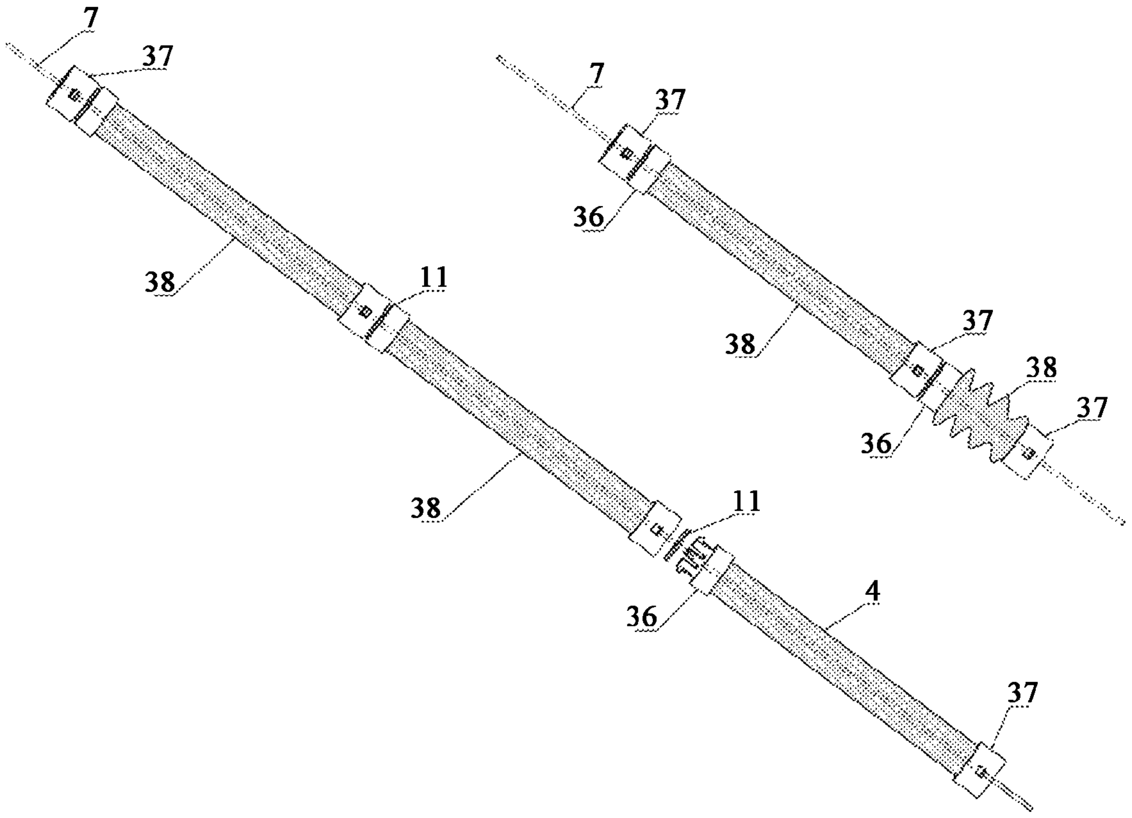
FIG. 5 shows a schematic diagram of a pull cord protection assembly according to a first embodiment of the present disclosure.

FIG. 5 shows a schematic diagram of a pull cord protection assembly 4 according to a first embodiment of the present disclosure. As shown in FIG. 5, the pull cord protection assembly 4 includes a plurality of segments that are connected end to end sequentially. In which, each segment includes a sheath (also referred to as a protective cover) 38. The sheath is preferably in a tubular shape and has a hollow internal channel defined therein for the pull cord 7 to pass through, and each segment may also be referred to as a shield here. As an example, a length of each segment or shield is smaller than 15 cm, and when the length is smaller than 15 cm, the folded shape is safe and sensible for children. The sheath 38 is made of a flexible material, so that at least part of the sheath can be folded in a longitudinal direction. The flexible material is, for example, a low-friction polymeric yarn material, preferably a polyester material, to minimize friction with the pull cord 7 and can be knitted on a crochet or knitting machine. In some embodiments, the pull cord 7 may be made of a polyester material to further reduce friction with the sheath 38 and to allow the pull cord and the sheath to easily slide against each other without excessive wear. The sheath 38 of each segment has a first end and a second end. At the first end, the sheath 38 is fixedly connected to the connection head 36, for example, in an injection molding or a gluing manner. At the second end, the sheath 38 is fixedly connected to the connection socket 37, for example, in an injection molding or a gluing manner. It goes without saying that each of the connection head 36 and the connection socket 37 is configured to have a hollow internal channel for the pull cord 7 to pass through.

Figure 6:
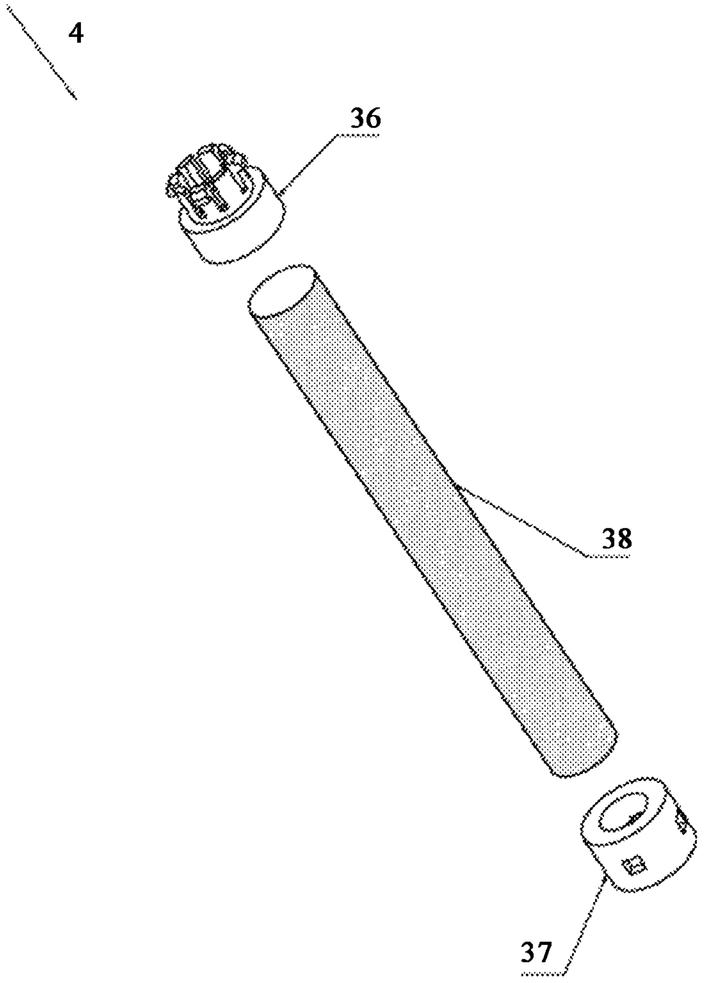
FIG. 6 shows a schematic exploded view of one of segments of the pull cord protection assembly 4 in FIG. 5.

FIG. 6 shows a schematic exploded view of one of segments of the pull cord protection assembly 4 in FIG. 5. As shown in FIG. 6, in this embodiment, the connection head 36 is configured to have a snap, and the connection socket 37 is configured to have a snap groove. The connection head 36 is capable of being engaged with the snap groove of the connection socket 37 through the snap, thereby enabling an end-to-end connection between a plurality of segments of the pull cord protection assembly 4. When the segments are connected end to end, the cover portion 1, that is, the plurality of positioning rings 11 at the curtain shading material are accommodated or sandwiched between the connection heads 36 and the connection sockets 37 that are connected to each other. Therefore, compared with the related art, there is no need to fix the positioning rings at the curtain shading material by knitting or the like, thereby realizing simpler assembly and production.

As further shown in FIG. 5, when the pull cord 7 is retracted, for example under the pulling force of the pull cord drive device 9, the segments of the pull cord protection assembly 4 may be folded as the pull cord 7 is retracted.

Figure 7:
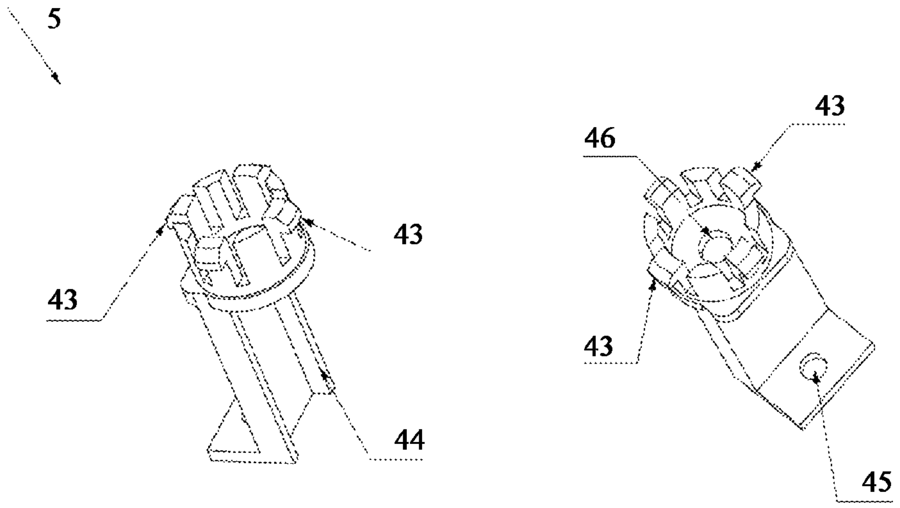
FIG. 7 shows a schematic diagram of a mounting bracket 5 according to a first embodiment of the present disclosure.

FIG. 7 shows a schematic diagram of a mounting bracket 5 according to a first embodiment of the present disclosure. As shown in FIG. 7, in this embodiment, the mounting bracket 5 is provided with a snap portion 43 similar to the connection head described above at the top surface of the mounting bracket. The snap portion 43 is capable of being engaged with the connection socket 37 of a lowermost segment of the pull cord protection assembly 4. In addition, the top surface has a through hole 46 for the pull cord 7 to pass through. The pull cord 7 is fixed to the connection socket 5 by knotting, gluing, etc. after passing through the through hole 46. Adjacent to the top surface of the mounting bracket is an L-shaped body. The L-shaped body is preferably provided with a reinforcing rib 44 at a side surface extending vertically thereof for increasing strength, and the L-shaped body has a mounting hole 45 at a bottom surface extending horizontally thereof for connecting to the lower rail, for example by means of screws or the like.

In addition, as a modification of the first embodiment, in addition to the connection method of using the snap and the snap groove, it is also contemplated that one of the connection head and the connection socket has a protrusion structure, such as a cylindrical protrusion structure, and the other one has a recess structure, such as a cylindrical recess structure, that matches with the protrusion structure in shape, in such a manner that the protrusion structure can be directly inserted into the recess structure to complete the connection. In order to enhance the strength of the connection, the connection head and the connection socket can be configured to have certain elasticity, so as to form an interference fit after insertion, thereby preventing the connection head and the connection socket from being loosened after insertion.

Figure 8:
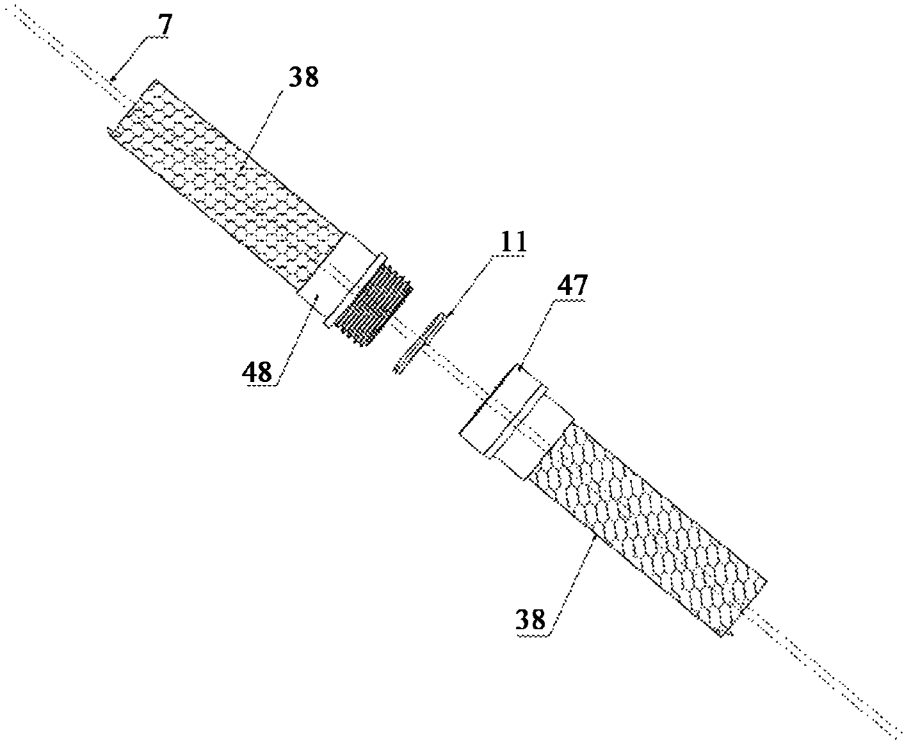
FIG. 8 shows a schematic diagram of a pull cord protection assembly 4 according to a second embodiment of the present disclosure.

FIG. 8 shows a schematic diagram of a pull cord protection assembly 4 according to a second embodiment of the present disclosure. As shown in FIG. 8, as in the first embodiment, the pull cord protection assembly 4 includes a plurality of segments that are connected end to end sequentially, in which each segment includes a sheath 38. The sheath is preferably in a tubular shape and has a hollow internal channel defined therein for the pull cord 7 to pass through. The sheath 38 is made of a flexible material, and in some embodiments the sheath 38 is configured as a loosely woven structure with meshes, such as prismatic meshes shown in FIG. 8, which has the advantage that the condition of the internal pull cord 7 can be seen through the loosely woven meshes. Note that such sheath in the loosely woven mesh structure is suitable not only for the second embodiment but also for any other suitable embodiment of the pull cord protection device according to the present disclosure. In addition, it goes without saying that a tightly woven flexible sheath with no mesh is also suitable for the pull cord protection assembly in the second embodiment, and the tightly woven flexible sheath has the advantage that the pull cord can be better protected and foreign matter such as dust and the like can be prevented from entering inside.

The sheath 38 of each segment has a first end and a second end. At the first end, the sheath 38 is fixedly connected to the connection head 47, for example, in an injection molding or a gluing manner. At the second end, the sheath 38 is fixedly connected to the connection socket 48, for example, in an injection molding or a gluing manner. It goes without saying that each of the connection head 47 and the connection socket 48 is configured to have a hollow internal channel for the pull cord 7 to pass through.

Different from the engagement connection of the first embodiment, in the second embodiment shown in FIG. 8, the connection head 47 and the connection socket 48 are connected through a thread connection. For example, as shown in FIG. 8, the connection head 47 is configured to have an internal thread and the connection socket 48 is configured to have an external thread mating with the internal thread. Note that the thread-connection manner is not limited to the form in FIG. 8, and for example other forms of thread-connection such as the connection head 47 having an external thread and the connection socket 48 having an internal thread may be used.

Accordingly, the structure of the mounting bracket 5 (not shown in the figure) according to the second embodiment of the present disclosure is similar to that of the mounting bracket 5 of the first embodiment, but instead of the snap portion of the first embodiment, the mounting bracket 5 of the second embodiment is provided with a thread-connection portion to be thread-connected to the mounting bracket 48 of a lowermost segment of the pull cord protection assembly 4.

Figure 9:
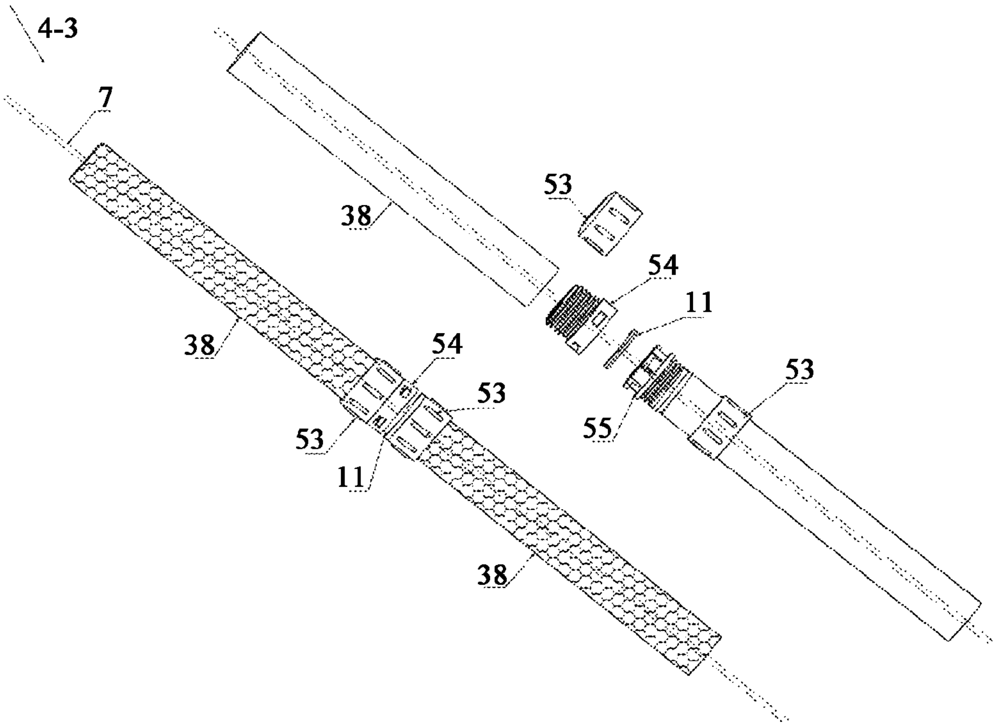
FIG. 9 shows a schematic diagram of a pull cord protection assembly 4 according to a third embodiment of the present disclosure.

FIG. 9 shows a schematic diagram of a pull cord protection assembly 4 according to a third embodiment of the present disclosure. As shown in FIG. 9, the pull cord protection assembly 4 also includes a plurality of segments that are connected end to end sequentially, in which each segment includes a sheath 38. The structure and material of the sheath may refer to the first embodiment and the second embodiment, which will not be elaborated herein. Different from the first embodiment and the second embodiment, the sheath 38 of each segment is fixedly connected at the first end and the second end not by injection molding or gluing or the like. Specifically, in this embodiment, the sheath 38 is fixedly connected to each of the connection head 55 and the connection socket 54 through a separate sheath fixation member 53.

As shown in FIG. 9, each of the connection head 55 and the connection socket 54 is configured to have an external thread, and the sheath fixation member 53 is configured to have an internal thread and can therefore be screwed into the external thread of each of the connection head 55 and the connection socket 54. During the screwing process, the first end and the second end of the sheath 38 can be respectively fixed between the connection head 55 and the sheath fixation member 53 corresponding to the connection head 55 and between the connection socket 54 and the sheath fixation member 53 corresponding to the connection socket 54. In this way, the connection and disassembly of the flexible sheath with the connection head and the connection socket respectively in a simple manner can be realized, which reduces the assembly cost on one hand and facilitates later maintenance on the other hand. In the embodiment shown in FIG. 9, the sheath fixation member 53 is configured as an annular structure having an internal thread, in particular an annular sleeve. Preferably, an anti-slip means such as an anti-slip rib for facilitating a manual tightening operation is configured at the outer surface of the annular structure.

In addition, as shown in FIG. 9, in this embodiment, the connection head 55 and the connection socket 54 are connected to each other in an engagement connection manner similar to that in the first embodiment, but of course it is also conceivable that the connection head 55 and the connection socket 54 are connected to each other in a thread-connection manner similar to that in the second embodiment. Similarly, depending on the connection manner of the connection head 55 and the connection socket 54, the structure of the mounting bracket 5 is similar to that in the first embodiment and the second embodiment, which will not be elaborated herein.

Figure 10:
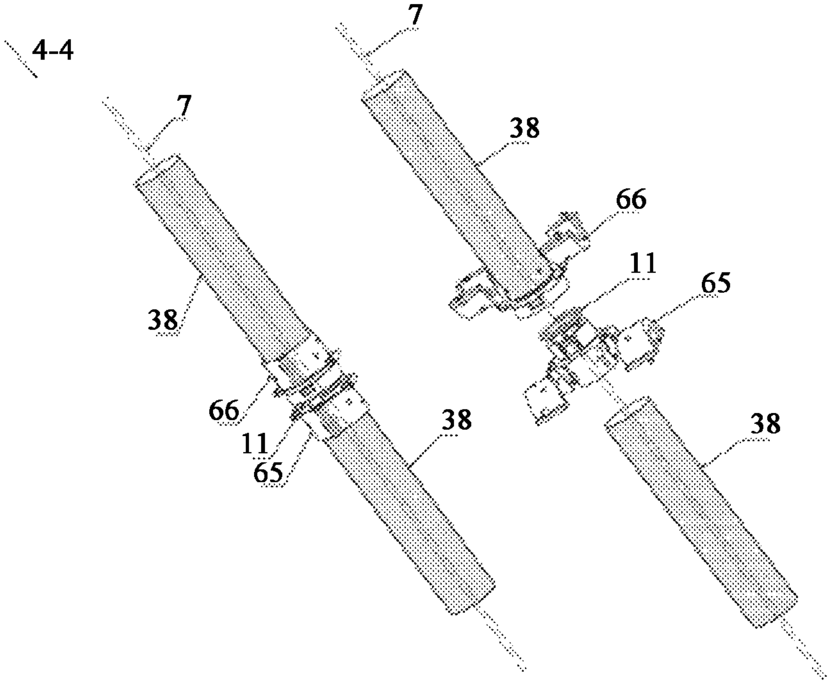
FIG. 10 shows a schematic diagram of a pull cord protection assembly 4 according to a fourth embodiment of the present disclosure.

FIG. 10 shows a schematic diagram of a pull cord protection assembly 4 according to a fourth embodiment of the present disclosure. As shown in FIG. 10, the pull cord protection assembly 4 also includes a plurality of segments that are connected end to end sequentially in the same manner as the previous other embodiments, in which each segment includes a sheath 38. The structure and material of the sheath may refer to the first embodiment and the second embodiment, which will not be elaborated herein. Different from the first embodiment and the second embodiment, the sheath 38 of each segment is fixedly connected at the first end and the second end not by injection molding or gluing or the like. Specifically, in this embodiment, each of the connection head 65 and the connection socket 66 is provided with a fixing mechanism for fixing the sheath 38.

Figure 11:
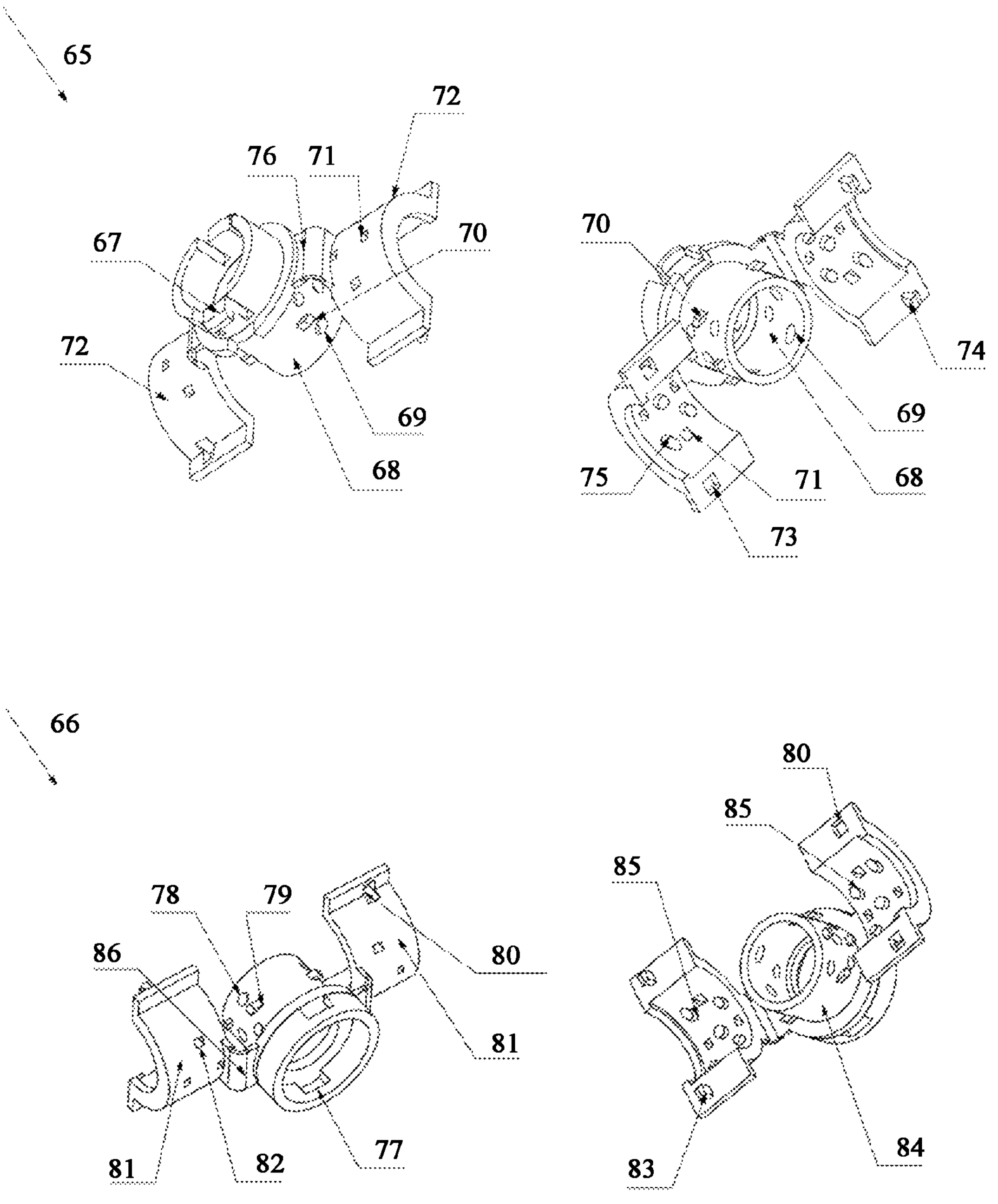
FIG. 11 shows details of a connection head and a connection socket of the pull cord protection assembly 4 in FIG. 10.

FIG. 11 shows details of the connection head 65 and the connection socket 66 of the pull cord protection assembly 4 in FIG. 10. In the specific embodiment shown in FIG. 11, the connection head 65 is provided with a snap portion 67 at one end thereof. The snap portion 67 is capable of being engaged with a snap groove portion 77 provided at a corresponding end of the connection socket 66. Of course, instead of the snap-fit connection, a connection type such as thread-connection similar to that of the second embodiment may be considered. The connection head 65 has another end configured as a first connection structure 68 (also referred to as a first hollow tube 68) in a hollow cylindrical shape. The first connection structure 68 is provided with several first protrusion portions 70 at an outer side wall thereof. The first connection structure 68 is provided with two semi-cylindrical first connection half parts 72 (also referred to as first semi-rings 72) at two positions that are symmetrical with respect to a central axis of the column, each first connection half part 72 being hinged optionally through a first hinge member 76. The two first connection half parts have first snap grooves 71 corresponding to the first protrusion portions 70. In addition, one of the two first connection half parts 72 has a first boss portion 74, and the other of the two first connection half parts 72 has a first snap groove portion 73, in such a manner that they can be engaged with each other. Thus, when the two first connection half parts are pivoted from an initial position to a fixed position where they are engaged with the first connection structure 68, the two first connection half parts 72 are respectively engaged with the first connection structure 68 and engaged with each other, to collectively surround the first connection structure 68 and the first end of the sheath 38, so as to be fixedly connected to the sheath 38.

Accordingly, the connection socket 66 is provided with a snap groove portion 77 at one end thereof. The snap groove portion 77 is capable of being engaged with the snap portion 67 provided at the corresponding end of the connection head 65. Of course, instead of the snap-fit connection, a connection type such as thread-connection similar to that of the second embodiment may be considered. The connection socket 66 has another end configured as a second connection structure 84 (also referred to as a second hollow tube 84) in a hollow cylindrical shape. The second connection structure 84 is provided with several second protrusion portions 79 at an outer side wall thereof. The second connection structure 84 is hinged with two semi-cylindrical second connection half parts 81 (also referred to as second semi-rings 81) at two positions that are symmetrical with respect to a central axis of the column, each second connection half part 81 being hinged optionally through a second hinge member 86. The two second connection half parts 81 have second snap grooves 77 corresponding to the second protrusion portions 79. In addition, one of the two second connection half parts 81 has a second boss portion 83, and the other of the two second connection half parts 81 has a second snap groove portion 82, in such a manner that they can be engaged with each other. Thus, when the two second connection half parts 81 are pivoted from an initial position to a fixed position where they are engaged with the second connection structure 84, the two second connection half parts 81 are respectively engaged with the second connection structure 84 and engaged with each other, to collectively surround the second connection structure 84 and the second end of the sheath 38, so as to be fixedly connected to the sheath 38.

In addition, as shown in FIG. 10 and FIG. 11, in this embodiment, the connection head 65 and the connection socket 66 are connected to each other in an snap-fit manner similar to that in the first embodiment, but of course it is also conceivable that the connection head and the connection socket are connected to each other in a thread-connection manner similar to that in the second embodiment. Similarly, depending on the connection type of the connection head and the connection socket, the structure of the mounting bracket 5 is similar to that in the first embodiment and the second embodiment, which will not be elaborated herein.

Further, instead of the fourth embodiment in which the connection head, the connection socket, and the sheath 38 are fixed with the two semi-cylindrical first connection half parts 72 and the two semi-cylindrical second connection half parts 81, or the third embodiment in which the sheath 38 is connected through the sheath fixation member 53 with the thread, the use of clamps, steel wires, and other fixing schemes conceivable to those skilled in the art may also be considered. Such variations are not to be regarded as a departure from the spirit and scope of the present disclosure.

Figure 12:
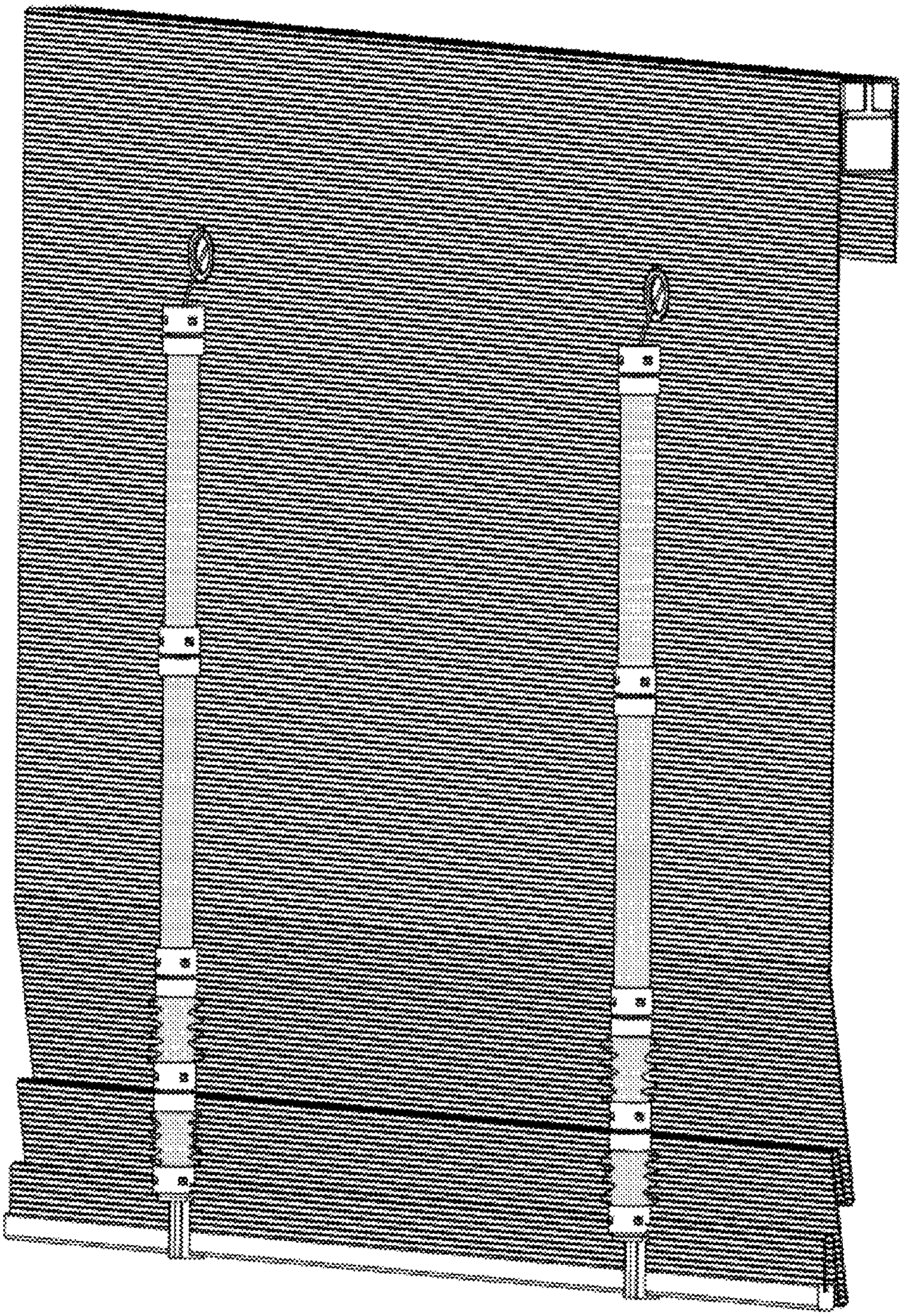
FIG. 12 shows a schematic diagram of a state of a curtain when a pull cord is tightened according to the present disclosure.

FIG. 12 shows a schematic diagram of a state of a curtain when a pull cord is tightened according to the present disclosure. As shown in FIG. 12, when the pull cord is tightened under the action of the pull cord drive device, the corresponding pull cord protection assembly folds to form a wrinkle with the tightening of the pull cord, forming a stable connection structure between each two positioning rings and having an aesthetic appearance.

The technical solution of the present disclosure is explained above in the exemplary preferred embodiments. It should be noted that the above embodiments are only used for illustrating the technical solution of the present disclosure, and not for limiting the same. Although the present disclosure has been described in detail with reference to the foregoing embodiments, it should be understood by those skilled in the art that it is also possible to modify the technical solution described in the preceding embodiments or to substitute some or all of the technical features with equivalents. Such modifications and substitutions do not depart from the spirit of the embodiments disclosed herein, and they should be construed as being included in the scope of the appended claims and description of the present disclosure. In particular, the features mentioned in the embodiments can be combined in any desired manner as long as no structural conflict exists. The present disclosure is not intended to be limited to the particular embodiments disclosed herein, but includes all embodiments falling within the scope of the appended claims.

What is claimed is:

1. A pull cord protection assembly for a curtain, wherein the curtain comprises a cover portion, the cover portion being provided with a plurality of positioning rings arranged in a vertical direction of the cover portion, and the curtain further comprises a pull cord configured to control lifting and lowering of the curtain, the pull cord protection assembly comprises a plurality of segments that are connected end to end sequentially, each of the plurality of segments comprising:

a flexible sheath in a tubular shape and having a hollow internal channel through which the pull cord passes, the flexible sheath having a first end and a second end;

a connection head capable of being fixedly connected to the first end of the flexible sheath and having a hollow internal channel; and a connection socket capable of being fixedly connected to the second end of the flexible sheath and having a hollow internal channel, wherein a connection head and a connection socket of two adjacent segments are capable of being connected to each other and holding one of the plurality of positioning rings therebetween.

2. The pull cord protection assembly according to claim 1, wherein the connection head and the connection socket of the two adjacent segments are connected to each other in a form-fit locking manner or a force locking manner.

3. The pull cord protection assembly according to claim 2, wherein the connection head and the connection socket are connected to each other in a snap-fit manner.

4. The pull cord protection assembly according to claim 2, wherein the connection head and the connection socket are connected to each other in a thread-connection manner.

5. The pull cord protection assembly according to claim 1, wherein the connection head is fixedly connected to the first end of the flexible sheath by injection molding or gluing, and the connection socket is fixedly connected to the second end of the flexible sheath by injection molding or gluing.

6. The pull cord protection assembly according to claim 1, further comprising two sheath fixation members configured to fixedly connect the first end and the second end of the flexible sheath to the connection head and the connection socket, respectively.

7. The pull cord protection assembly according to claim 6, wherein each of the connection head and the connection socket has one end configured to have an external thread, and each of the two sheath fixation members is configured as an annular sleeve having an internal thread, so that the two sheath fixation members are capable of fixing the flexible sheath between the connection head and the connection socket when thread-connected to the connection head and the connection socket.

8. The pull cord protection assembly according to claim 7, wherein each of the two sheath fixation members is configured to have a protrusion structure on an outer surface thereof for anti-slip.

9. The pull cord protection assembly according to claim 1, wherein the connection head has one end configured as a first connection structure having a hollow columnar shape, the first connection structure being hinged to two first connection half parts at two positions of the first connection structure, respectively, and the two positions being symmetrical with respect to a central axis of the first connection structure, wherein the two first connection half parts are pivotable to a first fixation position, and at the first fixation position, the two first connection half parts are snap-fitted with each other and are each snap-fitted with the first connection structure to fix the first end of the flexible sheath between the two first connection half parts and the first connection structure.

10. The pull cord protection assembly according to claim 9, wherein the connection socket has one end configured as a second connection structure having a hollow columnar shape, the second connection structure being hinged to two second connection half parts at two positions of the second connection structure, respectively, and the two positions being symmetrical with respect to a central axis of the second connection structure, wherein the two second connection half parts are pivotable to a second fixation position, and at the second fixation position, the two second connection half parts are snap-fitted with each other and are each snap-fitted with the second connection structure to fix the second end of the flexible sheath between the two second connection half parts and the second connection structure.

11. The pull cord protection assembly according to claim 1, wherein one of the connection head and the connection socket has a protrusion structure, and the other one of the connection head and the connection socket has a recess structure that matches with the protrusion structure in shape, and wherein the connection head and the connection socket are each made of an elastic material and capable of being connected to each other in an interference fit manner.

12. The pull cord protection assembly according to claim 1, wherein the flexible sheath is made of a fabric material.

13. A curtain, comprising:

an upper beam;

a mounting assembly configured to fix the upper beam to a surface to be mounted;

a cover portion having a flat shape and extending downwardly from the upper beam, the cover portion being provided with a plurality of positioning rings arranged in a vertical direction;

a pull cord configured to control lifting and lowering of the curtain; and a pull cord protection assembly, the pull cord protection assembly comprises a plurality of segments that are connected end to end sequentially, each of the plurality of segments comprising:

a flexible sheath in a tubular shape and having a hollow internal channel through which the pull cord passes, the flexible sheath having a first end and a second end;

a connection head capable of being fixedly connected to the first end of the flexible sheath and having a hollow internal channel; and a connection socket capable of being fixedly connected to the second end of the flexible sheath and having a hollow internal channel, wherein a connection head and a connection socket of two adjacent segments are capable of being connected to each other and holding one of the plurality of positioning rings therebetween.

14. The curtain according to claim 13, wherein the connection head and the connection socket of the two adjacent segments are connected to each other in a form-fit locking manner or a force locking manner.

15. The curtain according to claim 13, wherein the curtain further comprises a pull cord drive device and a pull cord retainer that are disposed below the upper beam.

16. The curtain according to claim 13, wherein the curtain further comprises a lower rail disposed below the cover portion, the lower rail being fixedly connected to a mounting bracket that is connected to a lower end of the pull cord, the mounting bracket being capable of being connected to a connection socket of a lowermost segment of the pull cord protection assembly in a form-fit locking manner or a force locking manner.

17. The curtain according to claim 13, wherein the mounting assembly comprises: a first member configured to have an L-shaped body, the L-shaped body comprising a first side surface extending vertically and a first top surface extending horizontally; and a second member configured to be L-shaped and having a second side surface extending vertically and a second top surface extending horizontally, wherein the first side surface is fixedly connected to a screw rod, the screw rod penetrating through a through hole formed at the second side surface and extending horizontally, and the screw rod being capable of driving the first member to move in a horizontal direction together with an adjustment nut.

18. The curtain according to claim 17, wherein the first top surface is provided with a guide member, the guide member being slidable in a guide groove formed at an end of the upper beam to be guided to move in a horizontal direction.

19. The curtain according to claim 18, wherein the second top surface has at least one mounting hole configured to fixedly connect the second top surface to the upper beam.

20. The curtain according to claim 19, wherein the mounting assembly further comprises an anti-slip element having a flat shape, the anti-slip element being in contact with a surface to be mounted during mounting, and the first member has a recess formed at the first side surface thereof and configured to accommodate the anti-slip element.

* * * * *